Sept. 11, 1923.

J. B. DES ROSIERS

TRUCK

Filed April 10, 1920

1,467,571

Inventor
John B Des. Rosiers

By Howard E Barlow
Atty.

Patented Sept. 11, 1923.

1,467,571

UNITED STATES PATENT OFFICE.

JOHN B. DES ROSIERS, OF PROVIDENCE, RHODE ISLAND.

TRUCK.

Application filed April 10, 1920. Serial No. 372,737.

*To all whom it may concern:*

Be it known that I, JOHN B. DES ROSIERS, a citizen of the United States, and resident of the city of Providence, in the county of Providence and State of Rhode Island, have invented certain new and useful Improvements in Trucks, of which the following is a specification.

This invention relates to an improvement in the construction of trucks more particularly adapted for use in carrying such parts as the rear end construction of an automobile or the like; and the invention has for its object to provide such a truck which is simple and practical in construction and which is mounted on casters or swivel wheels, whereby it is adapted to receive a universal rolling movement on the floor so that the parts carried thereby may be accurately positioned relative to the chassis, upon replacing the parts after having been removed therefrom.

A further object of the invention is to provide means whereby the work-receiving standards of the truck may be adjusted relative to each other.

A still further object of the invention is to provide means in this truck whereby it may be folded or reduced from its normal working size, to facilitate storage and shipping.

The nature and advantages of the invention will be better understood when the following detail description is taken in connection with the accompanying drawings, the invention residing in the combination and arrangement of parts as claimed.

In the drawings forming part of this specification, like numerals of reference indicate similar parts in the several views and wherein:—

Figure 1:
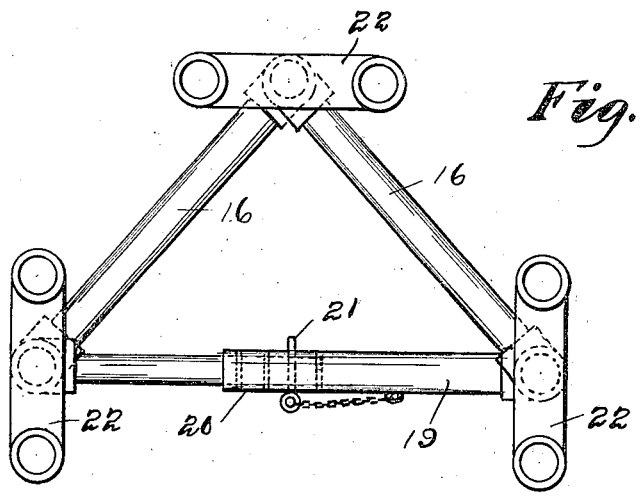
Figure 1 is a plan view of the device extended into operating position.

With reference to the drawings, 10 designates three standards which are preferably constructed of piping, the lower end of each being provided with a coupling 11 into which a special fitting 13 is threaded.

This special fitting is provided with a hollow center portion into which the hub member 13 of the caster member 14 is threaded and a pin 15 is passed lengthwise through this hub 13 to loosely secure the caster frame thereto, whereby the caster frame is permitted to swivel or rotate about the axis of this pin.

These three uprights when in operative position are preferably set to form a triangle, as illustrated in Figure 1, and each upright is supported from the other by means of connecting or spacer bars 16. The opposite ends of each of these bars are rotatably connected to two standards by means of T-shaped members 17 through which the tubular core or pipe 18 passes. The two rear standards being preferably connected by means of a jointed bar 19 which is preferably made of two parts adapted to telescope one within the other and these telescoping parts are drilled as at 20 to receive a lock-pin 21 whereby the space between these rear standards may be varied to fit different kinds of work.

In order to provide a simple and effective grooved rest or support for the work, I have formed a U-shaped member 22 having an internally-threaded neck 23 which is adapted to screw onto the upper end of the standard pipes 18 and a check-nut 24 is threaded onto this pipe for the purpose of binding these supporting members in adjusted position.

By which construction these supports may be rotated into any position and they may also be adjusted vertically when desired.

It will be seen by my improved construction that the different fittings are each adapted to swivel or rotate upon its standard but in some cases collars or spacer members 24 are provided to support the T-fittings by which construction all of the fittings are held in alinement.

Figures 2, 3:
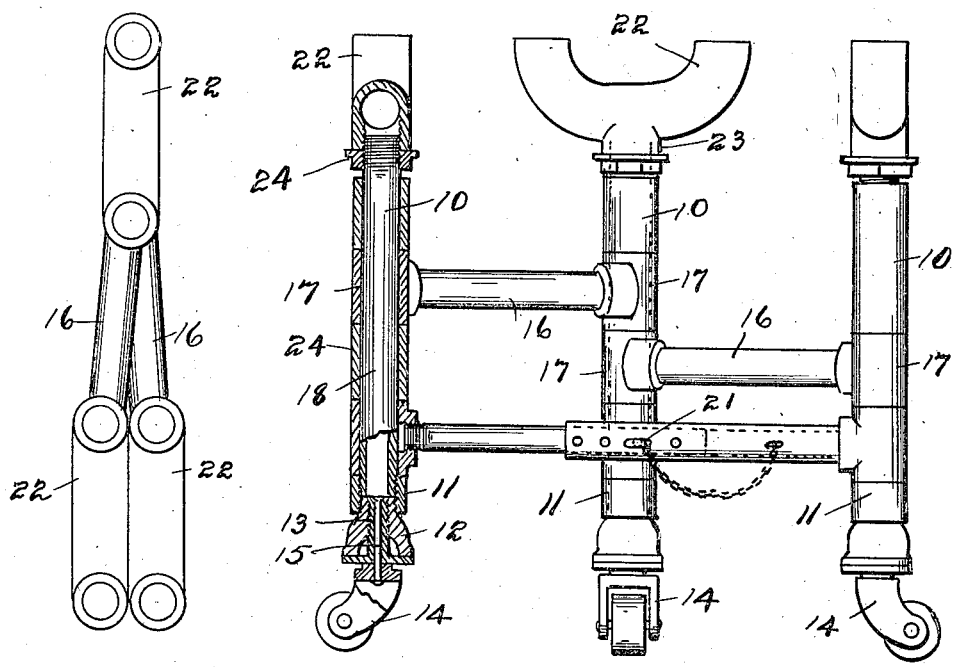
Figure 2 is a side elevation of the device partly in section illustrating the general construction and arrangement of parts.
Figure 3 is a top view of the device showing the same folded into inoperative position.

Then again by this separable connecting bar one portion may be withdrawn from the other and the two rear standards swung in close together or side by side as illustrated in Figure 3, so as to reduce the storage and shipping space required for the truck.

The device is very simple and inexpensive in construction as it is principally formed of standard pipe fittings, the T-members being bored out to rotate on the pipe standards, and the truck is particularly adapted for receiving the rear axle housing of an automobile which upon being disconnected from the chassis may be readily dropped onto the truck and easily removed from under the car for examination and repairs and as readily and accurately repositioned for reassembling, owing to the universal rolling movement which may be obtained by the action of the swivel rollers on the truck.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A truck comprising a plurality of standards, each standard being provided on its upper end with a load engaging and supporting member and on their lower ends with casters, a frame consisting of a plurality of spacing arms pivotally connected to each standard and maintaining the standards in spaced triangular arrangement and vertical relation, said arms being arranged in superposed relations on the standards, one of said arms being adapted to be disconnected from its respective standards, whereby the truck may be collapsed and said arms moved in substantially vertical alignment.

In testimony whereof I affix my signature.

JOHN B. DES ROSIERS.